A. K. P. BUFFUM.

Machine for Making Wooden Gutters for Buildings.

No. 6,675. Reissued Oct. 5, 1875.

Witnesses:-
Frank H. Jordan.
Edgar L. Brown

Inventor:
Albion K. P. Buffum
per Wm Henry Clifford
atty.

N. PETERS, PHOTO-LITHOGRAPHER, WASHINGTON, D. C.

A. K. P. BUFFUM.

Machine for Making Wooden Gutters for Buildings.

No. 6,675. Reissued Oct. 5, 1875.

Witnesses:
Frank H. Jordan
Charles E. Clifford

Inventor:
Albion K. P. Buffum
per Wm. Henry Clifford
atty.

N. PETERS, PHOTO-LITHOGRAPHER, WASHINGTON, D. C.

A. K. P. BUFFUM.

Machine for Making Wooden Gutters for Buildings.

No. 6,675. Reissued Oct. 5, 1875.

Witnesses:-
Frank H. Jordan.
Edgar L. Brown

Inventor:-
Albion K. P. Buffum
per Wm. Henry Clifford
atty.

N. PETERS, PHOTO-LITHOGRAPHER, WASHINGTON, D. C.

A. K. P. BUFFUM.

Machine for Making Wooden Gutters for Buildings.

No. 6,675. Reissued Oct. 5, 1875.

Witnesses:-
Frank H. Jordan
Edgar S. Brown

Inventor:
Albion K. P. Buffum
per Wm. Henry Clifford
atty.

N. PETERS, PHOTO-LITHOGRAPHER, WASHINGTON, D. C.

UNITED STATES PATENT OFFICE.

ALBION K. P. BUFFUM, OF GARDINER, MAINE, ASSIGNOR OF PART INTEREST TO HARTLEY W. JEWETT AND SANFORD N. MAXCY, OF SAME PLACE.

IMPROVEMENT IN MACHINES FOR MAKING WOODEN GUTTERS FOR BUILDINGS.

Specification forming part of Letters Patent No. 117,255, dated July 25, 1871; reissue No. 6,675, dated October 5, 1875; application filed September 23, 1875.

*To all whom it may concern:*

Be it known that I, ALBION K. P. BUFFUM, of Gardiner, in the county of Kennebec and State of Maine, have invented certain new and useful Improvements in Machines for Making Wooden Gutters for Buildings; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
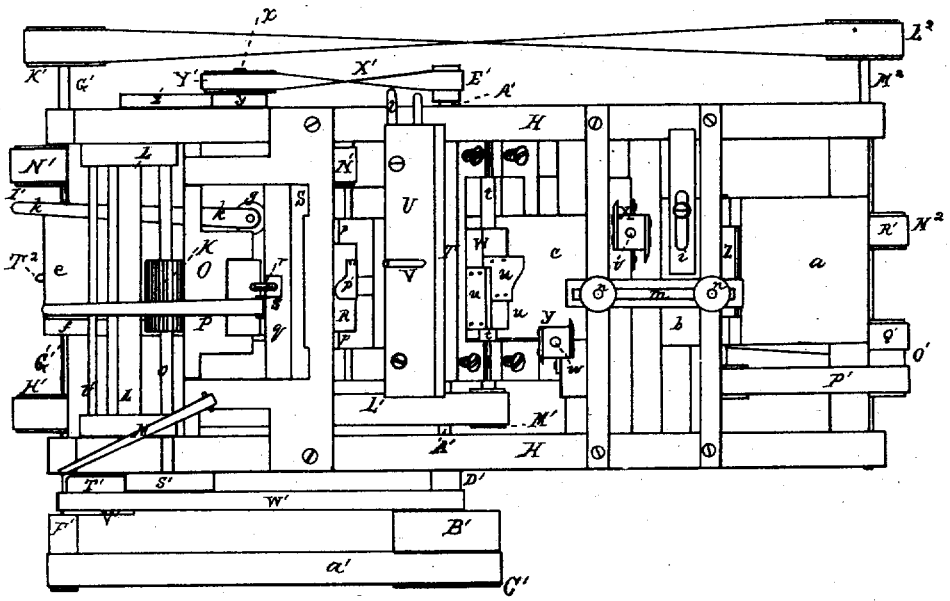
Figure 2:
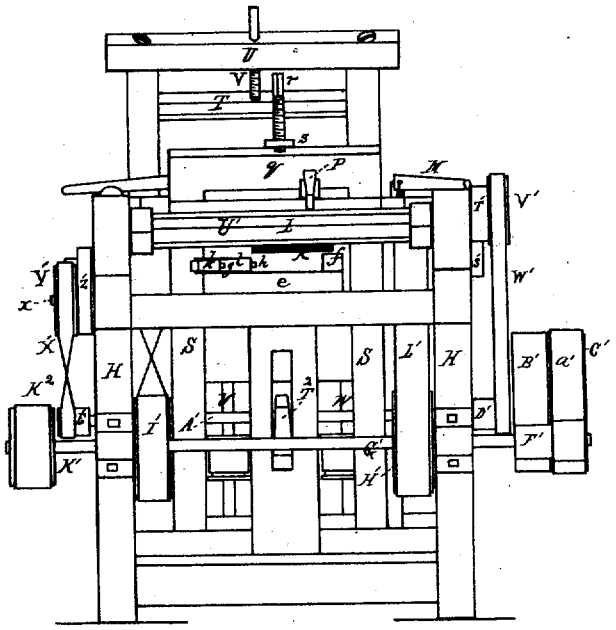
Figure 3:
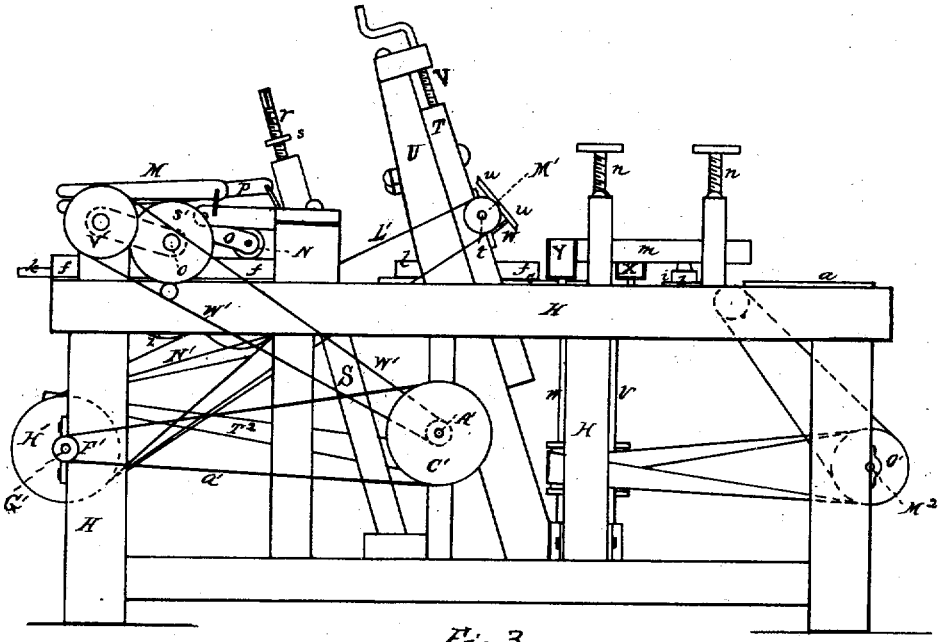
Figure 5:
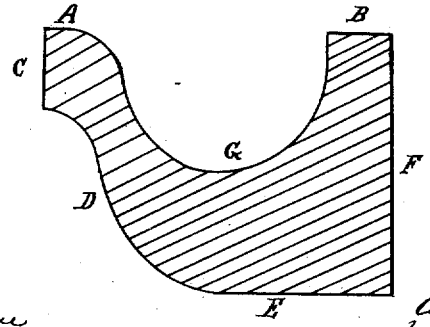
Figure 4:
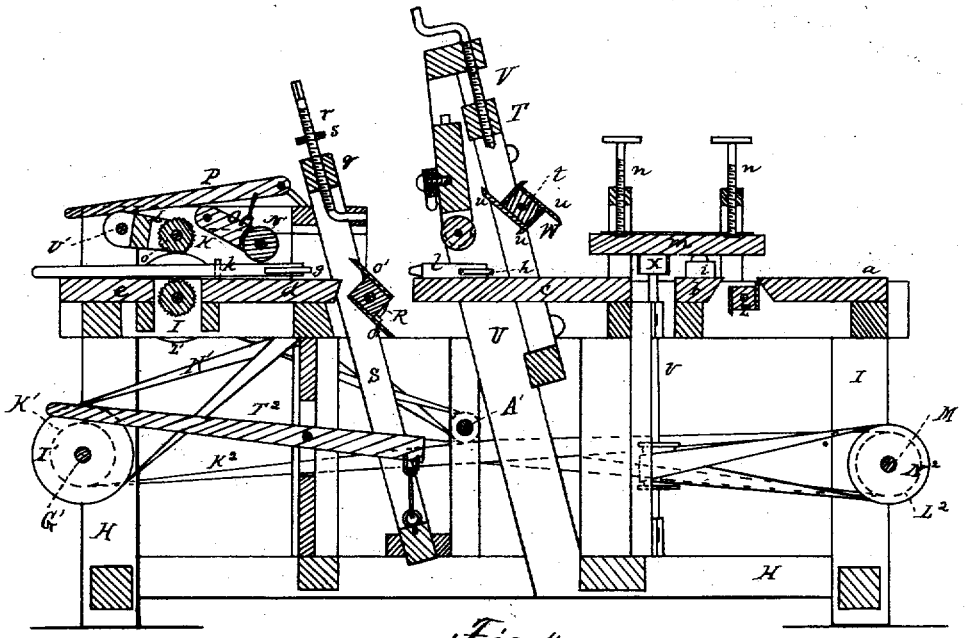

Figure 1 is a top view, Fig. 2 a rear-end elevation, Fig. 3 a side elevation, Fig. 4 a vertical longitudinal section, of such machine. Fig. 5 is a transverse section of a gutter as made by it.

My invention consists of a machine for the manufacture of gutters, and more particularly, first, of a machine in which the gutters can be manufactured with closed ends; or, in other words, a machine in which the gouging-knife can be made to so operate upon the lumber as to leave a slight portion of it untouched at each end of the stick; second, in a machine which is capable of molding and giving shape or form to the exterior of the gutter, and digging it or forming the trough therein at one and the same operation; third, in a machine capable of molding, digging, and planing the stock, and leaving the trough of the gutter with stopped ends at one operation.

In the drawings, H denotes the frame of the machine, it being provided with a series, *a b c d e*, of platforms, arranged in manner and with spaces between them as represented. There are side ledges or guides *f* on some of such platforms, the blank or stick being pressed against such ledges while being moved on the platforms. It is so forced up to the guides by a series of pressure-rollers, *g h*, and an adjustable gage, *i*, the pressure-rollers being carried by levers *k l*, to which weights or springs are to be applied to cause the rollers to bear the stick laterally. There is also an adjustable gage, *m*, arranged at the front of the machine, and provided with screws *n n* for elevating or depressing it relatively to the bed or platforms of the machine. Near the rear end of the frame is a feed-roller, I, and over such roller is a feed and pressure roller, K, the latter having its shaft *o* supported by a vibratory frame, L, provided with a hand-lever, M, for elevating and depressing the said frame. In advance of the roller K is another such roller, N, arranged in a vibratory frame, O, provided with a hand-lever, P, for effecting the vertical movements of such frame. In front of the said roller K is a rotary cutter-stock, R, provided with cutters *o'* for forming the hollow G (see Fig. 5) of the gutter. The shaft *p* of the said cutter-stock is supported in an inclined frame, S, arranged to slide up and down in suitable guides, and provided with an operative lever, $T^2$, properly applied to it and the main frame H, and arranged as represented. There extends upward from the frame H, in manner as shown, and through the upper girt *q* of the frame S, a stationary screw, *r*, furnished with a nut, *s*, the latter serving as a stop to arrest the frame S in its upward movement. Another cutter-frame, T, applied to a stationary inclined frame, U, (fixed on the frame H, as represented,) so as to be capable of being moved up and down against it has a screw, V, applied to it and the frame U, such being so as to change the attitude of the frame T as may be required.

The frame T supports the shaft *t* of a rotary cutter-stock, W, which is furnished with cutters *u u*, to form the surfaces D E. (See Fig. 5.) Furthermore, there are rotary cutter-heads X Y, arranged as represented, they being fixed on the upper parts of vertical shafts *v v*, and provided with cutters for dressing the stick, so as to form the side or parts C F, as shown in Fig. 5. In advance of these cutter-heads X Y there is a horizontal rotary cutter head or cylinder, Z, arranged as shown, its purpose being to dress the stick so as to form the plane surfaces A B. (See Fig. 5.)

The main shaft of the machine is shown at A' as provided with a main drivingpulley, B′, and also with other or auxiliary pulleys C′ D′ E′, arranged as set forth. From the pulley C′ an endless belt, *a*′, leads to, and imparts motion to, a pulley, F′, on a shaft, G′, arranged at the rear part of the frame. Three other pulleys, H′ I′ K¹, are fixed on the shaft G′. From the pulley H′ a belt, L¹, passes to and around a pulley, M¹, fixed on the shaft *t* of the cutter-stock W. So, from the pulley I′ an endless belt, N′, passes to and around a pulley fixed on the shaft *p* of the cutter-stock R′, and from the pulley K¹ a belt, K², extends to, and gives motion to, a pulley, L², fixed on a shaft, M², arranged at the front end of the frame H. The shaft M² carries two pulleys, N² O′, from which belts P′ Q′ R′ proceed to pulleys on the shafts of the cutter-cylinder Z and rotary cutter-heads X Y.

There is a wheel, S′, fixed on the shaft of the upper feed-roller, the periphery of the said wheel resting against that of an elastic roller or pulley, T¹, fixed on a shaft, U′, from which a belt, W′, extends to the pulley D′ on the main driving-shaft A′. A crossed belt, X′, extends from the pulley E′ of the shaft A′ to a pulley, Y′, arranged upon a stationary journal, *x*, and provided with an elastic pulley, *y*, to work against the periphery of a wheel or pulley, *z*′, fixed on the shaft of the lower feed-roller.

From the above it will be seen that when main driving-shaft is put in revolution rotary motions will be imparted to the feed-rollers, and also to the several cutter stocks or heads, which, as the stick is impelled through the machine, will reduce it to the form required.

In using the machine the front end of the stock to be reduced is entered between the feed-rollers, by which it will be seized, the stick being impelled or advanced by their action upon it.

In going through the said machine, and when submitted to all the operations thereof, the stick will be formed and grooved to the shape required, a transverse section of which is seen in Fig. 5.

When the hollow G is formed on the lumber with stopped ends to it, the cutter-cylinder is brought into action immediately after the front end has a little passed the cylinder, and just previous to the passage of the rear end of the stick by the said cutter-cylinder said cutter is depressed out of action on the stick. This forms a gutter with its ends stopped by means of a portion of the natural wood thereof being left uncut at each end. This is effected by the rotary cutter-stock R and its movable adjustable frame S, operated by a lever, T², or any other equivalent device, bp means of which the cutter-stock R is raised when desired, or allowed to drop.

By the same arrangement of devices, in connection with the screw *r* and nut *s*, the groove in the gutter can be made deeper in one point than another, if desired.

It will be perceived that the frames for holding the cutter-stocks are placed in inclined positions, in order to secure the uniform friction of the belts when the position of the frames are changed as described.

From the foregoing description it will be perceived that all of the operations of grooving, molding, and planing the stock can be simultaneously performed in this machine; or, the grooving and formation of the stopped ends, and the molding of the stick, can be simultaneously performed.

I make no claim to the mere combination of a bed, feed, and pressure rollers, lateral guides, and a cutter-cylinder, as used in common planing-machines for planing a board, or in machines for making a molding.

What I claim as my invention, and desire to secure by Letters Patent, is—

1. The rotary cutter-stock R, provided with its cutters to form the groove of the gutter, in combination with the inclined frame S, to operate as herein described, and for the purposes set forth.

2. The combination of the rotary cutter-stock R, inclined adjustable frame S, the rotary cutter-stock W, with its adjustable frame T, and the platforms *c d*, for the purpose of digging the gutters, as herein described, and molding the same at one operation of the machine, as herein specified.

3. The combination of the rotary cutter-stock R, frame S, rotary cutter-stock W, with its adjustable frame T, cutter-heads X Y, arranged as represented, and the rotary cutter-head Z, to plow, mold, and plane the gutter, substantially as herein described.

4. The gutter-machine hereinbefore described, the same consisting of the series of platforms *a b c d e*, the guide *f*, the pressure-rollers *g h*, adjustable gage *m*, the feed and pressure rollers I K N, the rotary cutter-stock R, with its adjustable frame S, rotary cutter-stock W, with its adjustable frame T, the cutter-heads X Y, and the cylinder Z, all the cutter heads or cylinders being provided with cutters, and the whole being constructed and combined together and applied to the frame H, substantially in manner and so as to operate as and for the purposes specified.

In testimony that I claim the foregoing I have hereunto set my hand.

A. K. P. BUFFUM.

Witnesses:
OSCAR MCCAUSLAND,
O. F. G. ANDREWS.